(12) United States Patent
Kim et al.

(10) Patent No.: US 11,652,213 B2
(45) Date of Patent: May 16, 2023

(54) ELECTRODE STRUCTURE, METHOD OF MANUFACTURING THE SAME, SECONDARY BATTERY INCLUDING THE SAME

(71) Applicants: UNIST(ULSAN NATIONAL INSTITUTE OF SCIENCE AND TECHNOLOGY), Ulsan (KR); KOREA EAST-WEST POWER CO., LTD., Ulsan (KR); 4 to One Co.,Ltd., Ulsan (KR)

(72) Inventors: Young sik Kim, Ulsan (KR); Young jin Kim, Ulsan (KR); Jeong sun Park, Ulsan (KR); Kyong min Jeon, Ulsan (KR); Young gi Kim, Pohang-si (KR); Myung jae Kim, Ulsan (KR)

(73) Assignees: UNIST(ULSAN NATIONAL INSTITUTE OF SCIENCE AND TECHNOLOGY), Ulsan (KR); KOREA EAST-WEST POWER CO., LTD., Ulsan (KR); 4 to One Co., Ltd., Ulsan (KR)

( * ) Notice: Subject to any disclaimer, the term of this patent is extended or adjusted under 35 U.S.C. 154(b) by 694 days.

(21) Appl. No.: 16/662,873

(22) Filed: Oct. 24, 2019

(65) Prior Publication Data

US 2020/0136120 A1 Apr. 30, 2020

(30) Foreign Application Priority Data

Oct. 24, 2018 (KR) ........................ 10-2018-0127779

(51) Int. Cl.
*H01M 50/531* (2021.01)
*H01M 4/74* (2006.01)
(Continued)

(52) U.S. Cl.
CPC .......... *H01M 50/531* (2021.01); *H01M 4/74* (2013.01); *H01M 4/78* (2013.01); *H01M 50/543* (2021.01);
(Continued)

(58) Field of Classification Search
CPC .... H01M 50/531; H01M 50/543; H01M 4/74; H01M 4/78; H01M 2004/021; H01M 2004/025
(Continued)

(56) References Cited

U.S. PATENT DOCUMENTS

| | | | | |
|---|---|---|---|---|
| 6,335,122 B1 * | 1/2002 | Yamada | ................. | H01M 4/133 |
| | | | | 429/231.9 |
| 7,141,187 B2 * | 11/2006 | Kosuzu | ................... | H01M 4/62 |
| | | | | 429/232 |

(Continued)

FOREIGN PATENT DOCUMENTS

| | | | | |
|---|---|---|---|---|
| CN | 105556733 A | * | 5/2016 | .......... H01M 10/052 |
| CN | 107171002 A | * | 9/2017 | .......... H01M 8/0202 |

(Continued)

*Primary Examiner* — Hai V Nguyen
(74) *Attorney, Agent, or Firm* — Studebaker & Brackett PC

(57) ABSTRACT

The present invention relates to an electrode structure, a method of manufacturing the same, and a secondary battery including the same, and the electrode structure may include a negative electrode part; a positive current collector which is formed of a fabric material and surrounds an outer surface of the negative electrode part; and a positive electrode coupled to an edge of the positive current collector.

20 Claims, 7 Drawing Sheets

(51) Int. Cl.
  *H01M 4/78* (2006.01)
  *H01M 50/543* (2021.01)
  *H01M 4/02* (2006.01)

(52) U.S. Cl.
  CPC ................ *H01M 2004/021* (2013.01); *H01M 2004/025* (2013.01)

(58) Field of Classification Search
  USPC .................................................. 423/235, 208
  See application file for complete search history.

(56) References Cited

U.S. PATENT DOCUMENTS

| | | | | |
|---|---|---|---|---|
| 7,316,792 | B2 * | 1/2008 | Kosuzu | H01M 4/62 252/521.3 |
| 7,335,448 | B2 * | 2/2008 | Kaito | H01M 50/531 429/231.95 |
| 7,803,290 | B2 * | 9/2010 | Kosuzu | H01M 4/366 252/521.3 |
| 7,833,656 | B2 * | 11/2010 | Nishimura | H01M 50/10 429/131 |
| 7,935,445 | B2 * | 5/2011 | Kaito | H01M 50/183 429/246 |
| 8,753,767 | B2 * | 6/2014 | Shimamura | H01M 50/10 429/178 |
| 8,894,722 | B2 * | 11/2014 | Lu | H01M 12/08 29/623.1 |
| 9,190,852 | B2 * | 11/2015 | Bienfang | H02J 9/00 |
| 9,350,008 | B2 * | 5/2016 | Shimamura | H01M 50/116 |
| 9,666,870 | B2 * | 5/2017 | Oladeji | H01M 4/74 |
| 10,497,941 | B2 * | 12/2019 | Chami | H01M 10/044 |
| 10,658,633 | B2 * | 5/2020 | Masumoto | H01M 50/184 |
| 2003/0224242 | A1 * | 12/2003 | Kaito | H01M 10/0525 429/231.95 |
| 2004/0062982 | A1 * | 4/2004 | Takezawa | H01M 50/116 429/211 |
| 2005/0284750 | A1 * | 12/2005 | Nishimura | H01M 4/0404 204/286.1 |
| 2006/0035152 | A1 * | 2/2006 | Nishimura | H01M 4/66 429/234 |
| 2006/0204837 | A1 * | 9/2006 | Kaito | H01M 10/0525 429/231.95 |
| 2006/0237697 | A1 * | 10/2006 | Kosuzu | H01M 4/386 252/500 |
| 2008/0090152 | A1 * | 4/2008 | Kosuzu | H01M 4/366 429/231.95 |
| 2010/0323098 | A1 * | 12/2010 | Kosuzu | H01M 4/386 |
| 2012/0328972 | A1 * | 12/2012 | Lu | H01M 50/522 429/535 |
| 2013/0108802 | A1 * | 5/2013 | Oladeji | C23C 18/1291 427/126.6 |
| 2013/0108920 | A1 * | 5/2013 | Oladeji | H01M 4/661 429/188 |
| 2013/0118798 | A1 * | 5/2013 | Hiraike | H01B 7/303 174/102 D |
| 2014/0170480 | A1 * | 6/2014 | Oladeji | H01M 10/0564 429/188 |
| 2014/0306529 | A1 * | 10/2014 | Yin | H02J 7/0071 320/160 |
| 2015/0110971 | A1 * | 4/2015 | Oladeji | H01M 4/139 427/565 |
| 2021/0376387 | A1 * | 12/2021 | Liang | H01M 4/626 |

FOREIGN PATENT DOCUMENTS

| | | | | |
|---|---|---|---|---|
| CN | 106601944 | B | * | 3/2019 |
| CN | 107946541 | B | * | 3/2020 .......... H01M 10/052 |
| CN | 106898778 | B | * | 4/2020 ........ H01M 10/0525 |
| EP | 3644410 | A1 | * | 4/2020 ........ H01M 10/0413 |
| KR | 10-2009-0127701 | A | | 12/2009 |
| KR | 10-1023919 | B1 | | 3/2011 |

* cited by examiner

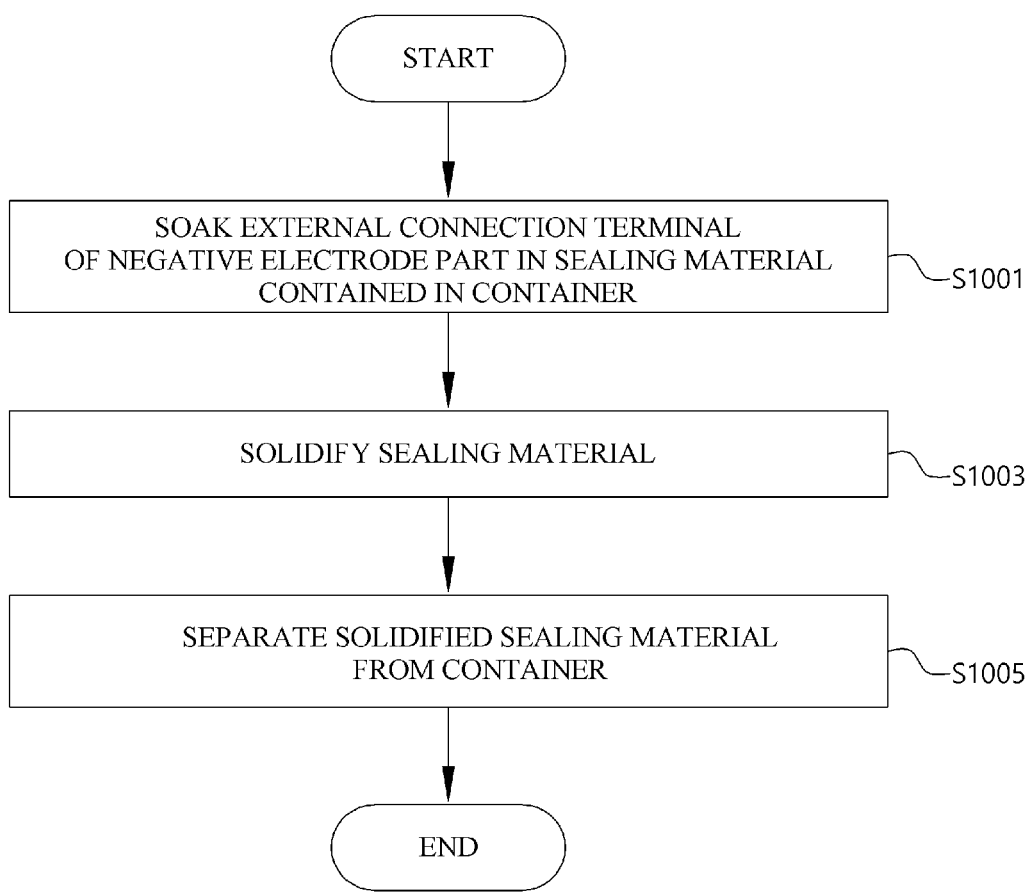

ELECTRODE STRUCTURE, METHOD OF MANUFACTURING THE SAME, SECONDARY BATTERY INCLUDING THE SAME

CROSS-REFERENCE TO RELATED APPLICATION

This application claims priority to and the benefit of Korean Patent Application No. 10-2018-0127779 filed on Oct. 24, 2018, the disclosure of which is incorporated herein by reference in its entirety.

BACKGROUND

1. Field of the Invention

The present invention relates to an electrode structure, a method of manufacturing the same, and a secondary battery including the same, and more specifically, to an electrode structure including a positive electrode coupled to an edge of a positive current collector, a method of manufacturing the same, and a secondary battery including the same.

2. Discussion of Related Art

Secondary batteries are batteries in which materials capable of electrochemical reaction are generally used for positive and negative electrodes so as to convert between chemical energy and electric energy such that charging and discharging occur. The secondary batteries are mainly used for vehicles, vessels, and the like which need to store a large amount of power.

A typical example of the secondary battery is a lithium ion battery configured to generate electric energy through a change in chemical potential when metal (for example, lithium or natrium) ions are intercalated/deintercalated between positive and negative electrodes. [Patent Document 1]

However, since the lithium ion battery has a high explosion risk and a price of a lithium metal oxide (for example, $LiCoO_2$ and $LiMn_2O_4$) used as a positive active material is high, a high expense is needed to form a large energy storage system (ESS), and an environment problem may occur when a waste battery is treated.

Accordingly, a material which has a low explosion risk, is eco-friendly, is abundant on the earth, and is inexpensive needs to be selected, but a study result thereof is still insufficient.

SUMMARY OF THE INVENTION

The present invention is directed to providing an electrode structure and a method of manufacturing the same.

In addition, the present invention is directed to providing a secondary battery including an electrode structure.

Objectives of the present invention are not limited to the above-described objectives, and other objectives which are not described above will be clearly understood through following descriptions.

According to an aspect of the present invention, there is provided an electrode structure including a negative electrode part, a positive current collector which is formed of a fabric material and surrounds an outer surface of the negative electrode part, and a positive electrode coupled to an edge of the positive current collector.

The positive electrode may be formed to have an edge frame form in which a central portion is hollow.

The positive electrode may be formed of a metallic material.

The positive electrode may be formed to have a mesh form.

The positive current collector and the positive electrode may be coupled by spot welding.

The positive current collector and the positive electrode may be coupled by coupling a bolt and a nut.

The negative electrode part may include a negative current collector in which a part of an upper end portion thereof is externally exposed to form an external connection terminal, and the external connection terminal may be insulated and sealed.

The external connection terminal may be soaked in a sealing material contained in a container, the sealing material may be solidified in a state in which the external connection terminal is soaked in the sealing material, and the solidified sealing material may be separated from the container.

According to another aspect of the present invention, there is provided a method of manufacturing an electrode structure including forming a negative electrode part, forming a positive current collector which is formed of a fabric material and surrounds an outer surface of the negative electrode part, and forming a positive electrode coupled to an edge of the positive current collector.

The forming of the positive electrode may include forming the positive electrode to have an edge frame form in which a central portion is hollow and coupling the positive electrode to the edge of the positive current collector.

The forming of the positive electrode may include forming the positive electrode to have a mesh form.

The forming of the negative electrode part may include forming a negative current collector in which a part of an upper end portion thereof is exposed to form an external connection terminal, and the method may further include insulating and sealing the external connection terminal after the forming of the positive electrode.

The insulating and sealing of the external connection terminal may include soaking the external connection terminal in a sealing material contained in a container, solidifying the sealing material in a state in which the external connection terminal is soaked in the sealing material, and separating the solidified sealing material from the container.

According to still another aspect of the present invention, there is provided an electrode structure stack including a plurality of electrode structures, wherein each of the plurality of electrode structures includes a negative electrode part, a positive current collector which is formed of a fabric material and surrounds an outer surface of the negative electrode part, and a positive electrode coupled to an edge of the positive current collector.

The negative electrode part may include a negative current collector in which a part of an upper end portion thereof is externally exposed to form an external connection terminal, and the external connection terminals of the plurality of electrode structures may be insulated and sealed.

The external connection terminals may be soaked in a sealing material contained in a container, the sealing material may be solidified in a state in which the external connection terminals are soaked in the sealing material, and the solidified sealing material may be separated from the container.

Each of the plurality of electrode structures may include one or more holes at the same position, and the plurality of electrode structures may be coupled by commonly insertion coupling one bolt to each of the one or more holes and coupling a nut to the one bolt for each of the plurality of electrode structures.

According to yet another aspect of the present invention, there is provided an secondary battery including a negative electrode part including a plurality of solid electrolytes, a negative active material, and a negative electrolytic solution; a positive current collector which is formed of a fabric material and surrounds an outer surface of the negative electrode part; and a positive electrode coupled to an edge of the positive current collector, wherein the electrode structure is soaked in an ion containing solution including metal ions which are the same as metal ions included in the negative active material.

The negative electrode part may include a negative current collector in which a part of an upper end portion thereof is externally exposed to form an external connection terminal, and the external connection terminal may be insulated and sealed.

The external connection terminal may be soaked in a sealing material contained in a container, the sealing material may be solidified in a state in which the external connection terminal is soaked in the sealing material, and the solidified sealing material may be separated from the container.

Specific contents for realizing the above-described objectives will be clear through embodiments which will be described in detail with reference to the accompanying drawings.

However, the present invention may not be limited to the embodiments which will be described below and may be realized in various different forms and is provide in order to fully describe the scope of the present invention to those of ordinary skill in the art (hereinafter, an ordinary skilled person).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 10 is a flowchart illustrating a method of sealing a negative electrode part according to one embodiment of the present invention.

DETAILED DESCRIPTION OF EXEMPLARY EMBODIMENTS

Since the present invention allows for various changes and numerous embodiments, specific embodiments will be illustrated in the accompanying drawings and described in detail.

Various features appended in the claims will be more clearly understood with reference to the accompanying drawings and detailed descriptions. Apparatuses, methods, manufacturing methods, and various embodiments disclosed in the specification are provided as exemplary embodiments. The disclosed structural and functional features are for those skilled in the art to specifically realize the various embodiments and not to limit the scope of the present invention. The disclosed terms and sentences are to describe the disclosed invention such that those skilled in the art easily understand and not to limit the scope of the present invention.

In the description of the present invention, the detailed descriptions related to the present invention will be omitted in a case in which it is determined that the detailed descriptions related to known technology may unnecessarily obscure the gist of the present invention.

Hereinafter, an electrode structure, a method of manufacturing the same, and a secondary battery including the same according to embodiments of the present invention will be described.

A secondary battery described in the present specification includes an electrode structure according to one embodiment of the present invention and refers to a secondary battery including an ion containing solution as a positive electrolytic solution. In this case, the electrode structure may be soaked in the ion containing solution including metal ions, which is the same as metal ions included in a negative active material of a negative electrode part. As a non-restrictive example, the ion containing solution may be seawater including sodium ions, lithium ions, magnesium ions, and combinations thereof.

Figure 1:
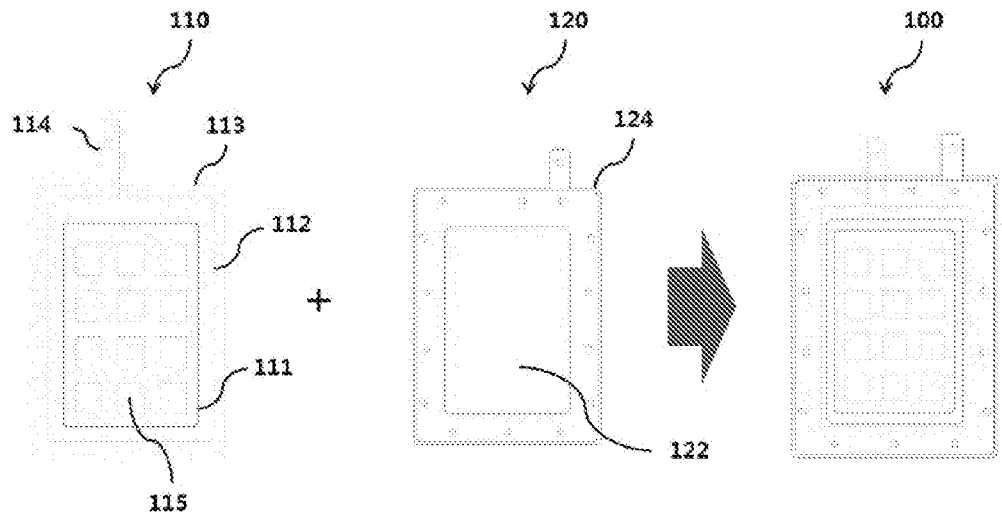
FIG. 1 is a view illustrating a functional configuration of an electrode structure according to one embodiment of the present invention.
Figure 2:
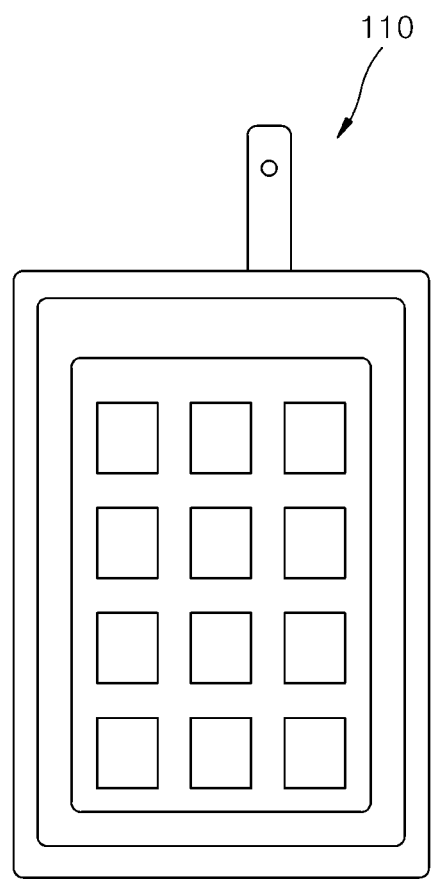
FIG. 2 is a view illustrating an example of a negative electrode part according to one embodiment of the present invention.
Figure 3:
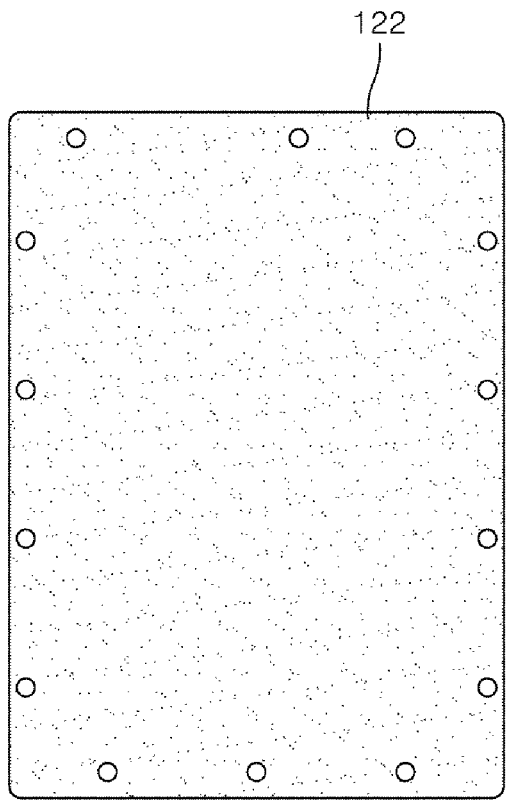
FIG. 3 is a view illustrating an example of a positive current collector according to one embodiment of the present invention.
Figure 4A:
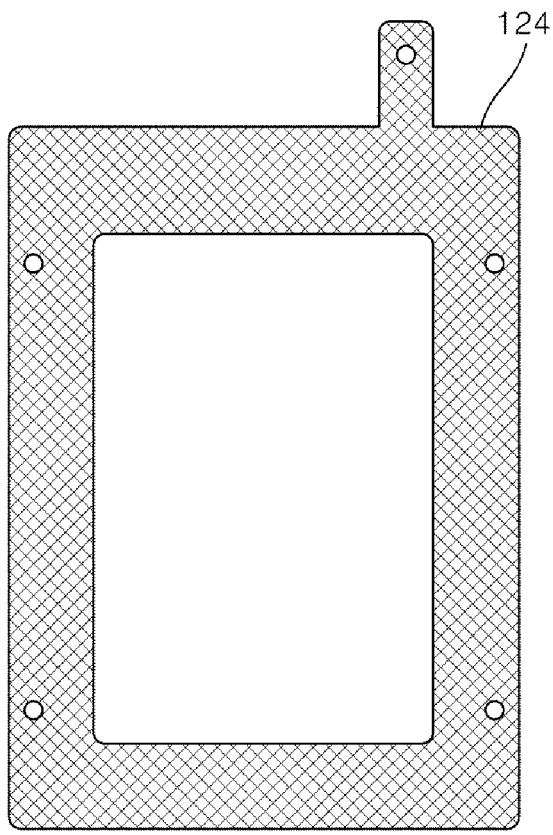
FIGS. 4A and 4B are views illustrating a positive electrode according to one embodiment of the present invention.
Figure 4B:
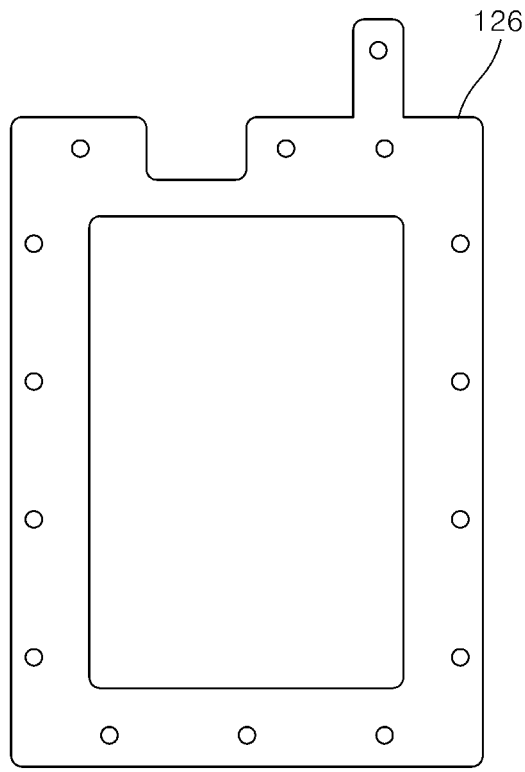

FIG. 1 is a view illustrating a functional configuration of an electrode structure 100 according to one embodiment of the present invention. FIG. 2 is a view illustrating an example of a negative electrode part 110 according to one embodiment of the present invention. FIG. 3 is a view illustrating an example of a positive current collector 122 according to one embodiment of the present invention. FIGS. 4A and 4B are views illustrating a positive electrode 124 according to one embodiment of the present invention.

Referring to FIG. 1, the electrode structure 100 may include the negative electrode part 110 and a positive electrode part 120. In one embodiment, the electrode structure 100 may be referred to as a unit cell, a full cell, or a different name having a technical meaning equivalent thereto.

Referring to FIG. 2, the negative electrode part 110 may include a body portion 111, a laminator 112, a sealing member 113, a negative current collector 114, and solid electrolytes 115 so as to form a negative electrode of the electrode structure 100. In one embodiment, the negative electrode part 110 may include a negative active material and a negative electrolytic solution.

The body portion 111 may support the negative electrode part 110 and prevent the negative electrode part 110 from being bent or deformed due to an external force. The body portion 111 may include a plurality of openings. The solid electrolytes 115 may be positioned in each of the plurality of openings.

One surface of the laminator 112 may be fused to one surface of the body portion 111. The laminator 112 may prevent external water vapor and atmospheric gas from being introduced into the negative electrode part 110. A material of the laminator 112 may be an aluminum laminator film. Meanwhile, the laminator 112 may include a plurality of openings. A size of each of the plurality of openings may be less than a size of the solid electrolyte 115. Accordingly, an edge of each of the plurality of openings may be fused to an edge of the solid electrolyte 115.

The sealing member 113 may be fused to an edge of the negative electrode part 110 to seal the edge of the negative electrode part 110. More specifically, the edge of the negative electrode part 110 is an edge of the laminator 112, and the edge of the laminator 112 may be sealed by the sealing member 113. The sealing member 113 may prevent a cut portion of the laminator 112 from being exposed to the outside.

One surface of a lower end portion of the negative current collector 114 may be in contact with a negative active material layer. In addition, a part of an upper end portion of the negative current collector 114 may be exposed to the outside to form an external connection terminal. The solid electrolyte 115 is an electrolyte capable of selectively transmitting metal ions such as lithium ions and sedum ions and may be provided as a plurality of solid electrolytes. For example, a material of the solid electrolyte 115 may be a sodium (Na) super ionic conductor (NASICON), a lithium super ionic conductor (LISICON), an amorphous ion conductor, a ceramic ion conductor, or a polymer-based material.

The positive electrode part 120 may include the positive current collector 122 and the positive electrode 124 to form a positive electrode of the electrode structure 100.

Referring to FIG. 3, the positive current collector 122 may be formed of a fabric material. In this case, the positive current collector 122 may have electronic conductivity and may be formed of a material which is stable against an ion containing solution (for example, seawater). For example, the positive current collector 122 is formed of a carbon fabric-based material having a liquid absorbent property. An example of the carbon fabric-based material may be carbon felt, carbon cloth, or the like.

The positive current collector 122 may absorb an external ion containing solution, and the ion containing solution absorbed in the positive current collector 122 may come into contact with the solid electrolyte 115 included in the negative electrode part 110. Accordingly, as the secondary battery is charged or discharged, metal ions (for example, $Li^+$ or $Na^-$) in the ion containing solution and the negative electrolytic solution may be exchanged through the solid electrolyte 115.

Referring to FIG. 4A, the positive electrode 124 may be formed to have a mesh form, and the positive current collector 122 coupled to the positive electrode 124 may easily absorb the external ion containing solution due to the mesh form. In one embodiment, referring to FIG. 4B, the positive electrode 124 may be formed to have a plate form instead of the mesh form as long as the positive current collector 122 absorbs the external ion containing solution and does not reduce the performance of the secondary battery.

In addition, the positive electrode 124 may be formed to have a quadrilateral edge frame form in which a central portion is hollow and may be coupled to an edge of the positive current collector 122. That is, the positive electrode 124 may support the edge of the positive current collector 122. In this case, since a size of the positive current collector 122 is greater than a size of the negative electrode part 110, the form of the entire electrode structure 100 may not be supported by only the positive current collector 122 formed of a fabric material. Accordingly, since the positive electrode 124 having a fixed form, that is, the quadrilateral edge frame form in which the central portion is hollow, is coupled to the positive current collector 122, the positive electrode 124, instead of the positive current collector 122, may serve as a support configured to maintain the form of the entire electrode structure 100.

Since the positive electrode 124 is formed of a metallic material and is in contact with the positive current collector 122, the positive electrode 124 may compensate for low electronic conductivity of the positive current collector 122. That is, since the positive electrode 124 is formed of the metallic material and compensates for high resistance of the positive current collector 122, the positive electrode 124 may serve as a path which allows electronics to easily move therethrough. The positive electrode 124 may be stable against the ion containing solution (for example, seawater) and may support an entirety of the electrode structure 100, and a material having electronic conductivity may be applied to the positive electrode 124. For example, the positive electrode 124 may be formed of titanium, a polymer to which electronic conductivity is applied, or a polymer to which metal is attached.

Figure 5:
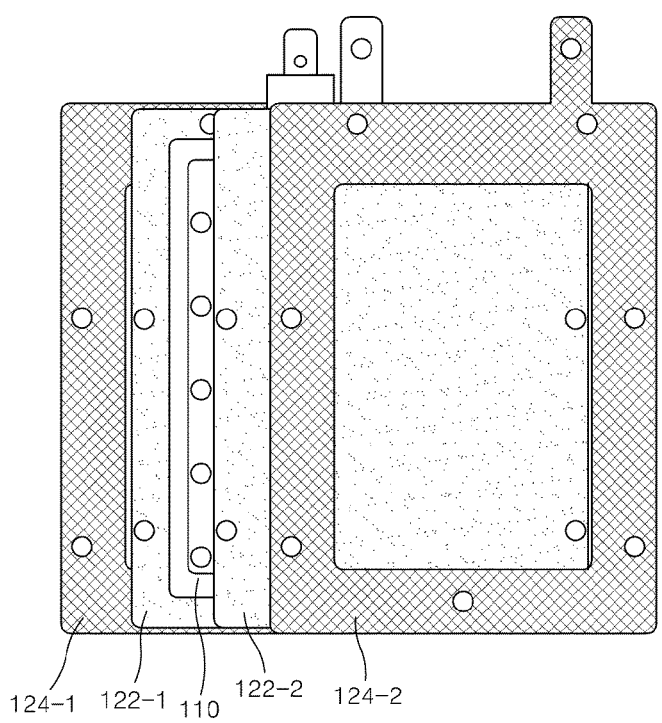
FIG. 5 is a view illustrating a coupling structure of an electrode structure according to one embodiment of the present invention.
Figure 6A:
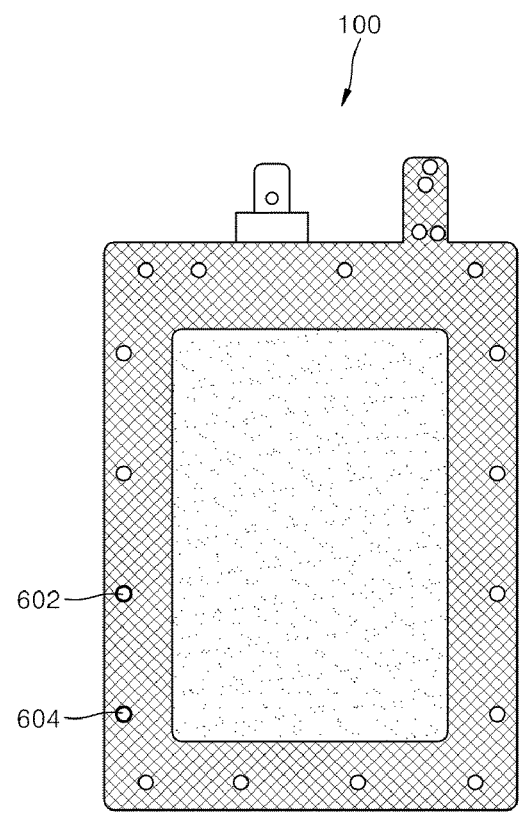
FIGS. 6A and 6B are views illustrating coupling methods of an electrode structure according to one embodiment of the present invention.
Figure 6B:
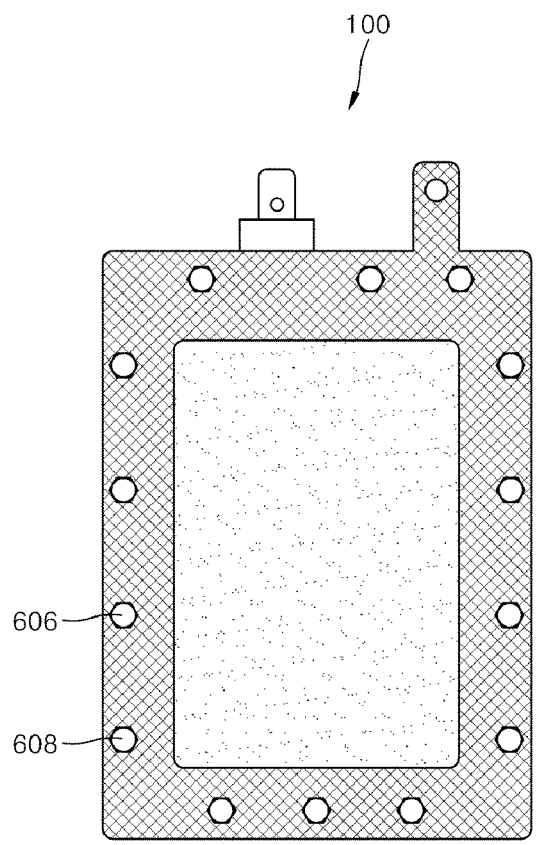

FIG. 5 is a view illustrating a coupling structure of an electrode structure 100 according to one embodiment of the present invention. FIGS. 6A and 6B are views illustrating coupling methods of an electrode structure 100 according to one embodiment of the present invention.

Referring to FIG. 5, an electrode structure 100 may include a negative electrode part 110, a first positive current collector 122-1, a second positive current collector 122-2, a first positive electrode 124-1, and a second positive electrode 124-2.

One surface of the negative electrode part 110 is pressed against one surface of the first positive current collector 122-1, and the other surface of the first positive current collector 122-1 is pressed against the first positive electrode 124-1. In addition, the other surface of the negative electrode part 110 is pressed against one surface of the second positive current collector 122-2, and the other surface of the second positive current collector 122-2 is pressed against the second positive electrode 124-2. In this case, since a size of the first positive current collector 122-1 and a size of the second positive current collector 122-2 are greater than a size of the negative electrode part 110, an outer surface of the negative electrode part 110 is surrounded by a positive current collector, that is, the first positive current collector 122-1 and the second positive current collector 122-2. In one embodiment, the first positive current collector 122-1 and the second positive current collector 122-2 may be pressed against the outer surface of the negative electrode part 110 and may be fused to at least a part of the outer surface of the negative electrode part 110 or adhered thereto by an adhesive. Accordingly, in the electrode structure 100, since an electrolyte comes into contact with an ion containing solution through both surfaces of the electrode structure 100, a reaction area can be maximized. Here, a part of an upper end portion of a negative current collector of the negative electrode part 110 may be exposed to the outside to form an external connection terminal.

In one embodiment, referring to FIG. 6A, the first positive electrode 124-1, the first positive current collector 122-1, the negative electrode part 110, the second positive current collector 122-2, and the second positive electrode 124-2 are sequentially overlapped to form the electrode structure 100. In this case, the first positive electrode 124-1, the first positive current collector 122-1, the second positive current collector 122-2, and the second positive electrode 124-2 are parts to be welded and may be coupled to each other by performing spot welding on welding zones 602 and may include a stack hole 604, in addition to the welding zones 602, so as to be coupled to another electrode structure by coupling a bolt and a nut.

In another embodiment, referring to FIG. 6B, a first positive electrode 124-1, a first positive current collector 122-1, a negative electrode part 110, a second positive current collector 122-2, and a second positive electrode 124-2 may be sequentially overlapped to form an electrode structure 100. In this case, the first positive electrode 124-1, the first positive current collector 122-1, the second positive current collector 122-2, and the second positive electrode 124-2 may be coupled by coupling a bolt and a nut to a hole 606 and may include a stack hole 608, in addition to the holes 606, so as to be coupled to another electrode structure by coupling a bolt and a nut.

Figure 7A:
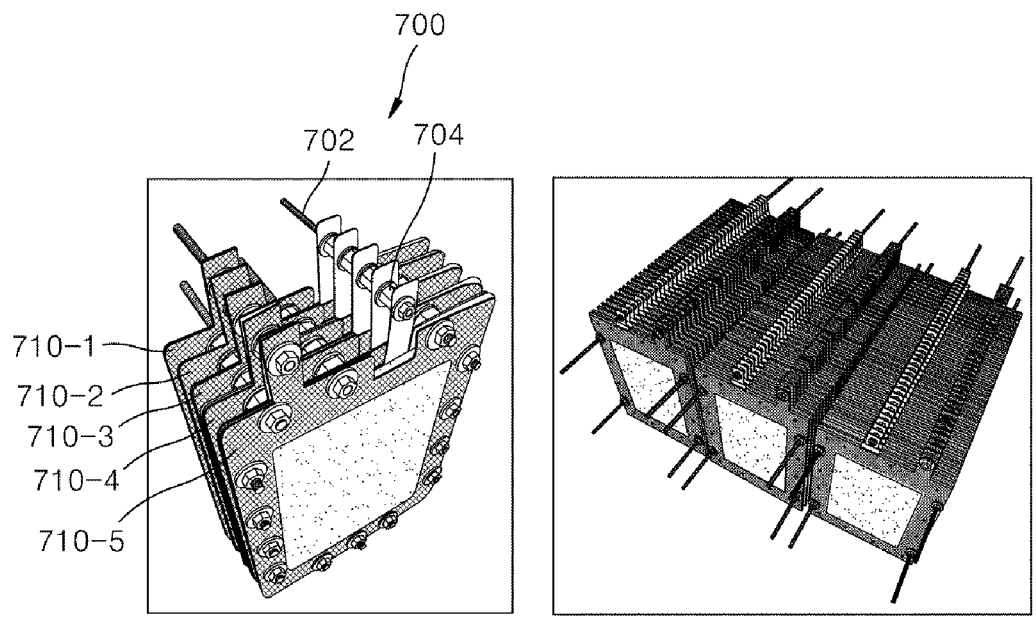
FIG. 7A is a view illustrating a structure of an electrode structure stack according to one embodiment of the present invention.
Figure 7B:
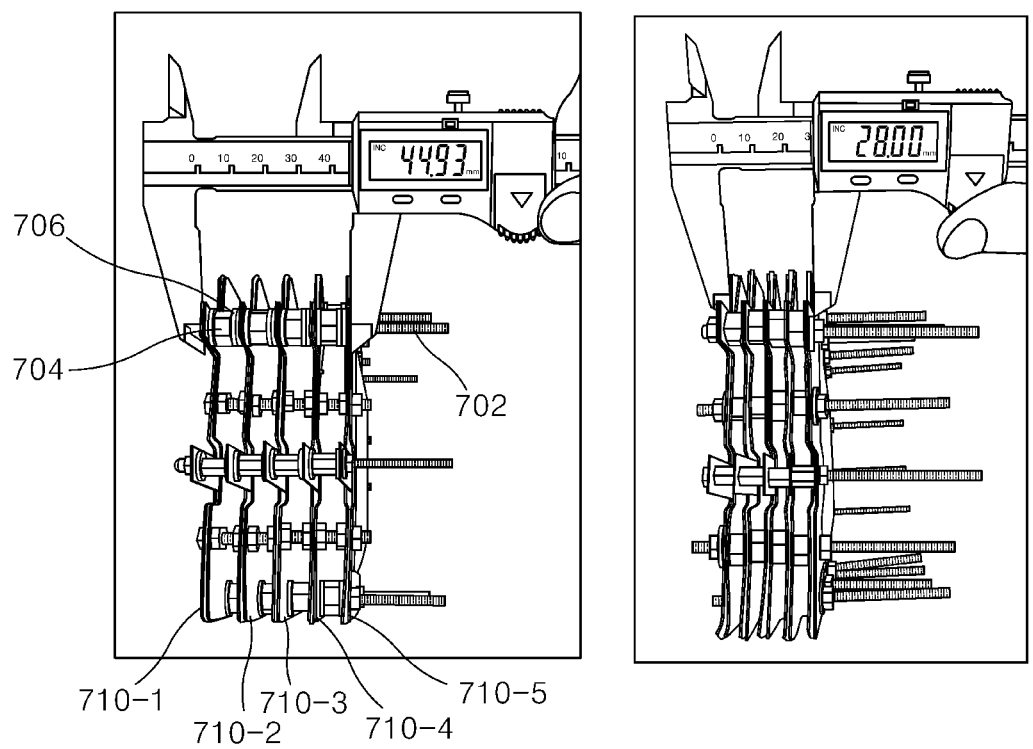
FIG. 7B is a view illustrating an example of adjusting distances between electrode structures according to one embodiment of the present invention.

FIG. 7A is a view illustrating a structure of an electrode structure stack according to one embodiment of the present invention. FIG. 7B is a view illustrating an example of adjusting distances between electrode structures according to one embodiment of the present invention.

Referring to FIG. 7A, an electrode structure stack 700 may include a plurality of electrode structures 710-1 to 710-5. In this case, the plurality of electrode structures 710-1 to 710-5 may be coupled by bolts 702 and nuts 704.

Specifically, since each of the plurality of electrode structures 710-1 to 710-5 includes at least one hole at the same position, and the bolt 702 is commonly insertion-coupled to the holes, the nut 704 is coupled to each of the plurality of electrode structures 710-1 to 710-5, a stack structure having a minimum volume may be formed, and an electrode structure may be further coupled to one common bolt 702 in the corresponding holes according to necessary power or energy of an application to which the plurality of electrode structures 710-1 to 710-5 are applied.

Referring to FIG. 7B, distances between the plurality of electrode structures 710-1 to 710-5 may be determined according to a flow rate of an ion containing solution. Specifically, as the flow rate of the ion containing solution increases, the ion containing solution may be more easily introduced into spaces between the plurality of electrode structures 710-1 to 710-5, and thus the distances between the plurality of electrode structures 710-1 to 710-5 can be determined to be narrow, and a volume of the electrode structure stack 700 can be reduced.

One or more ring members 706 are insertion-coupled to the bolt 702 to be positioned between the plurality of electrode structures 710-1 to 710-5 so as to correspond to the determined distances, and thus the distances between the plurality of electrode structures 710-1 to 710-5 can be adjusted. Specifically, since the ring members 706 and the bolt 702 are insertion-coupled such that the plurality of ring members 706, in which the number thereof is to adjust the distances determined by considering a thickness of one ring member 706, are positioned between the plurality of electrode structures 710-1 to 710-5, the distances between the plurality of electrode structures 710-1 to 710-5 can be adjusted.

Figure 8:
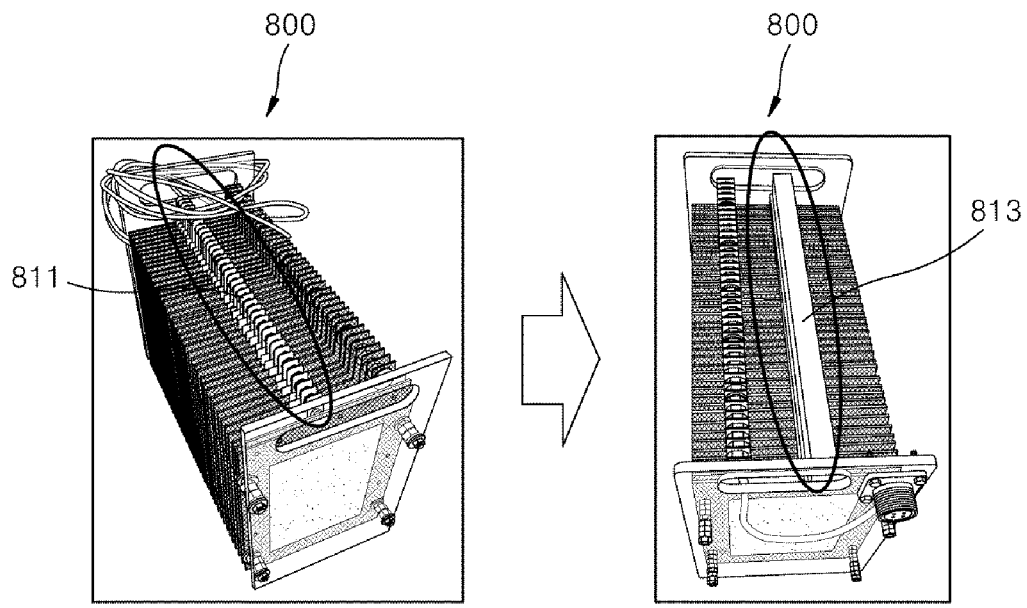
FIG. 8 is a view illustrating a sealing of a negative electrode part according to one embodiment of the present invention.

FIG. 8 is a view illustrating a sealing of a negative electrode part according to one embodiment of the present invention;

Referring to FIG. 8, outer surfaces of negative electrode parts of electrode structures included in an electrode structure stack 800 are surrounded by positive current collectors. In this case, a part of an upper end portion of a negative current collector of the negative electrode part is exposed to the outside to form an external connection terminal 811.

Here, in a case in which the electrode structure stack 800 is completely soaked in an ion containing solution, the part of the upper end portion of the negative current collector, that is, the external connection terminal 811, which is exposed to the outside so as to prevent a short circuit between positive electrode parts and the negative electrode parts, may be insulated and sealed. In one embodiment, in a state in which the external connection terminal 811 is soaked in an insulating and sealing material contained in a container and the insulating and sealing material is solidified in a state in which the external connection terminal 811 is soaked in the insulating and sealing material, the solidified insulating and sealing material 813 is separated from the container, and thus the external connection terminal 811 may be insulated and sealed.

Figure 9:
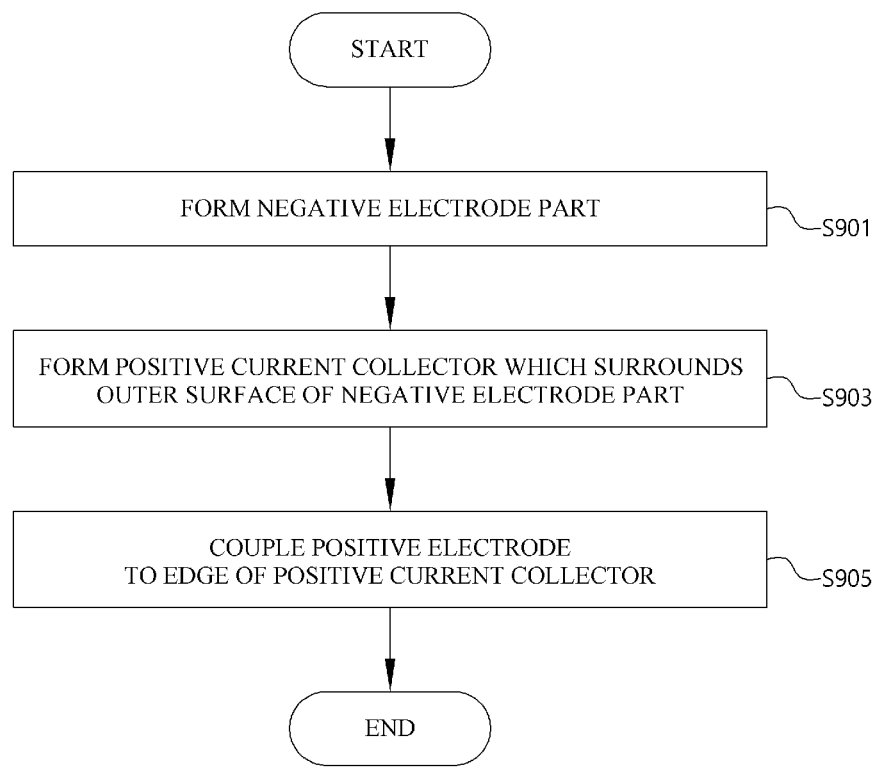
FIG. 9 is a flowchart illustrating a method of manufacturing an electrode structure according to one embodiment of the present invention.

In this case, the insulating and sealing material 813 may be a material which does not have electronic conductivity, has high adhesion to the external connection terminal 811, and is stable against the ion containing solution (for example, seawater). For example, the insulating and sealing material may include an epoxy, silicone, a hot melt, rubber, a polymer, and plastic. FIG. 9 is a flowchart illustrating a method of manufacturing an electrode structure according to one embodiment of the present invention.

Referring to FIG. 9, in operation S901, a negative electrode part is formed. In one embodiment, a negative current collector in which a part of an upper end portion thereof is exposed to form an external connection terminal may be formed.

In operation S903, a positive current collector which surrounds an outer surface of the negative electrode part is formed. In one embodiment, the positive current collector may be formed of a fabric-based material having a liquid absorbent property.

In operation S905, a positive electrode is coupled to an edge of the positive current collector. In one embodiment, the positive electrode may be formed to have an edge frame form in which a central portion is hollow and may be coupled to the edge of the positive current collector. In one embodiment, the positive electrode may be formed using a metallic material. In one embodiment, the positive electrode may be formed to have a mesh form. In one embodiment, the positive current collector and the positive electrode may be coupled by coupling a bolt and a nut. In another embodiment, a positive current collector and a positive electrode may be coupled by spot welding. In one embodiment, after the operation of forming the positive electrode, the external connection terminal may be insulated and sealed.

FIG. 10 is a flowchart illustrating a method of sealing a negative electrode part according to one embodiment of the present invention.

Referring to FIG. 10, in operation S1001, an external connection terminal of the negative electrode part of an electrode structure is soaked in a sealing material contained in a container. In one embodiment, the sealing material may be a material which does not have electronic conductivity, has high adhesion to the external connection terminal, and is stable against an ion containing solution (for example, seawater).

In operation S1003, the sealing material is solidified. In operation S1005, the solidified sealing material is separated from the container. Accordingly, in a case in which the electrode structure is completely soaked in the ion containing solution, a short circuit between a positive electrode part and the negative electrode part of the electrode structure can be prevented.

According to one embodiment of the present invention, a positive electrode can be formed in a mesh form, and a positive current collector coupled to the positive electrode can easily absorb an external ion containing solution due to the mesh form.

In addition, according to one embodiment of the present invention, since a positive electrode is formed in an edge frame form in which a central portion is hollow, and is coupled to an edge of a positive current collector, the positive electrode can support an entirety of an electrode structure.

In addition, according to one embodiment of the present invention, since a positive electrode is formed of a metallic material and is in contact with a positive current collector, a low electronic conductivity of a positive current collector can be compensated for.

In addition, according to one embodiment of the present invention, a stack structure having a minimized volume can be formed due to a structure of an electrode structure stack, and an electrode structure can be additionally coupled to one common bolt in each hole corresponding to necessary power or energy of an application to which the electrode structure is applied.

In addition, according to one embodiment of the present invention, since a part of an upper end portion of a negative current collector exposed to the outside, that is, an external connection terminal is insulated and sealed, in a case in which an electrode structure is completely soaked in an ion containing solution, a short circuit between a positive electrode part and a negative electrode part can be prevented.

Effects of the present invention are not limited to the above-described effects, and expected provisional effects due to technical features of the present invention will be clearly understood from the above descriptions.

The above description is only an example describing a technological scope of the present invention, and various changes, modifications, and replacements may be made by those skilled in the art without departing from the spirit of the present invention.

Therefore, the embodiments disclosed above should be considered in a descriptive sense only and not for limiting the technological sprit of the present invention, and the scope of the present invention is not limited by the embodiments.

The scope of the present invention should be interpreted by the appended claims and should encompass all equivalents falling within the scope of the appended claims.

What is claimed is:

1. An electrode structure comprising:
a negative electrode part;
a positive current collector which is formed of a fabric material and surrounds an outer surface of the negative electrode part; and
a positive electrode coupled to an edge of the positive current collector,
wherein the positive electrode is formed to have an edge frame form in which a central portion is hollow.

2. The electrode structure of claim 1, wherein the positive electrode is formed of a metallic material.

3. The electrode structure of claim 1, wherein the positive electrode is formed to have a mesh form.

4. The electrode structure of claim 1, wherein the positive current collector and the positive electrode are coupled by spot welding.

5. The electrode structure of claim 1, wherein the positive current collector and the positive electrode are coupled by coupling a bolt and a nut.

6. The electrode structure of claim 1, wherein:
the negative electrode part includes a negative current collector in which a part of an upper end portion thereof is externally exposed to form an external connection terminal; and
an entire portion of the external connection terminal is insulated and sealed by an insulating and sealing material, from an outside of the electrode structure.

7. The electrode structure of claim 6, wherein:
a part of the insulating and sealing material is a solidified material in a state in which the external connection terminal is soaked in the insulating and sealing material.

8. The electrode structure of claim 1, further comprising:
a positive electrolytic solution that is a ion containing solution comprising seawater including sodium ions, magnesium ions, and combinations thereof;
an external connection terminal which is exposed to an outside the electrode structure so as to prevent a short circuit between positive electrode parts and negative electrode parts of the electrode structure; and
an insulating and sealing material, which does not have electronic conductivity, has an adhesion to the external connection terminal to insulate and seal the external connection terminal, and is stable against the ion containing solution, wherein the insulating and sealing material includes at least one of an epoxy, silicone, a hot melt, rubber, a polymer, and plastic,
wherein the positive current collector is formed of the fabric material that is a carbon fabric-based material comprising at least one of carbon felt and carbon cloth,
wherein the positive electrode comprises at least one of titanium, a polymer to which electronic conductivity is applied, and a polymer to which metal is attached, and
wherein a size of the positive current collector is greater than a size of the negative electrode part.

9. A method of manufacturing an electrode structure, comprising:
forming a negative electrode part;
forming a positive current collector which is formed of a fabric material and surrounds an outer surface of the negative electrode part; and
forming a positive electrode coupled to an edge of the positive current collector by:
forming the positive electrode to have an edge frame form in which a central portion is hollow; and
coupling the positive electrode to the edge of the positive current collector.

10. The method of claim 9, wherein the forming of the positive electrode includes forming the positive electrode to have a mesh form.

11. The method of claim 9, wherein:
the forming of the negative electrode part includes forming a negative current collector in which a part of an upper end portion thereof is exposed to form an external connection terminal; and
the method further includes insulating and sealing the external connection terminal after the forming of the positive electrode.

12. The method of claim 11, wherein the insulating and sealing of the external connection terminal includes:
soaking the external connection terminal in an insulating and sealing material contained in a container;
solidifying a part of the insulating and sealing material in a state in which the external connection terminal is soaked in the insulating and sealing material; and
separating the solidified part of the insulating and sealing material from the container.

13. The method of claim 9, further comprising:
forming a positive electrolytic solution that is a ion containing solution comprising seawater including sodium ions, magnesium ions, and combinations thereof;
forming an external connection terminal which is exposed to an outside the electrode structure so as to prevent a short circuit between positive electrode parts and negative electrode parts of the electrode structure; and
forming an insulating and sealing material, which does not have electronic conductivity, has an adhesion to the external connection terminal to insulate and seal the external connection terminal, and is stable against the ion containing solution, wherein the insulating and sealing material includes at least one of an epoxy, silicone, a hot melt, rubber, a polymer, and plastic,
wherein the positive current collector is formed of the fabric material that is a carbon fabric-based material comprising at least one of carbon felt and carbon cloth,
wherein the positive electrode comprises at least one of titanium, a polymer to which electronic conductivity is applied, and a polymer to which metal is attached, and
wherein a size of the positive current collector is greater than a size of the negative electrode part.

14. An electrode structure stack comprising a plurality of electrode structures, each of which is the electrode structure according to claim 1.

15. The electrode structure stack of claim 14, wherein:
the negative electrode part includes a negative current collector in which a part of an upper end portion thereof is externally exposed to form an external connection terminal; and
an entire portion of the external connection terminals of the plurality of electrode structures is insulated and sealed by an insulating and sealing material, from an outside of the electrode structure.

16. The electrode structure stack of claim 15, wherein:
the external connection terminals are soaked in an insulating and sealing material contained in a container;
a part of the insulating and sealing material is solidified, in a state in which the external connection terminals are soaked in the sealing material; and
the solidified part of the insulating and sealing material is separated from the container.

17. The electrode structure stack of claim 14, wherein:
each of the plurality of electrode structures includes one or more holes at the same position; and
the plurality of electrode structures are coupled by commonly insertion-coupling one bolt to each of the one or more holes and coupling a nut to the one bolt for each of the plurality of electrode structures.

18. A secondary battery comprising:
an electrode structure comprising:
a negative electrode part including a plurality of negative electrolytes, a negative active material, and a negative electrolytic solution;
a positive current collector which is formed of a fabric material and surrounds an outer surface of the negative electrode part; and
a positive electrode coupled to an edge of the positive current collector,
wherein the electrode structure is soaked in an ion containing solution including metal ions which are the same as metal ions included in the negative active material, and
wherein the positive electrode is formed to have an edge frame form in which a central portion is hollow.

19. The secondary battery of claim 18, wherein:
the negative electrode part includes a negative current collector in which a part of an upper end portion thereof is externally exposed to form an external connection terminal; and
the external connection terminal is insulated and sealed.

20. The secondary battery of claim 19, further comprising:
a part of the insulating and sealing material, that is a solidified material in a state in which the external connection terminal is soaked in the sealing material.

* * * * *